United States Patent
So (10) Patent No.: US 11,511,574 B2
(45) Date of Patent: Nov. 29, 2022

(54) TIRE ABNORMALITY DETECTION DEVICE AND ITS DETECTION METHOD

(71) Applicant: HANKOOK TIRE & TECHNOLOGY CO., LTD, Seongnam-si (KR)

(72) Inventor: Soon Hong So, Daejeon (KR)

(73) Assignee: HANKOOK TIRE & TECHNOLOGY CO., LTD, Seongnam-si (KR)

( * ) Notice: Subject to any disclaimer, the term of this patent is extended or adjusted under 35 U.S.C. 154(b) by 5 days.

(21) Appl. No.: 17/173,809

(22) Filed: Feb. 11, 2021

(65) Prior Publication Data

US 2021/0252924 A1     Aug. 19, 2021

(30) Foreign Application Priority Data

Feb. 17, 2020 (KR) ........................ 10-2020-0019158

(51) Int. Cl.
*B60C 23/06* (2006.01)
*G01M 3/04* (2006.01)
*G01M 17/06* (2006.01)

(52) U.S. Cl.
CPC ........... *B60C 23/064* (2013.01); *G01M 17/06* (2013.01); *G01M 3/04* (2013.01)

(58) Field of Classification Search
CPC ........... B60C 23/0435; B60C 23/0416; B60C 23/0489; B60C 23/0488; B60C 23/0415; B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246;
(Continued)

(56) References Cited

U.S. PATENT DOCUMENTS 8,002,288 B2 * 8/2011 Koguchi .......... B60G 17/01908
                                                            280/5.521
9,073,393 B2 * 7/2015 Hanna ................. B60C 23/0488
(Continued)

FOREIGN PATENT DOCUMENTS

EP      1794007 B1 * 4/2008 ............. B60C 19/00
EP      3599114 A1 * 1/2020 ........... B60C 11/243
(Continued)

*Primary Examiner* — Nimeshkumar D Patel
*Assistant Examiner* — Gedeon M Kidanu
(74) *Attorney, Agent, or Firm* — Bridgewayt IP Law Group, PLLC; Jihun Kim (57) ABSTRACT

Proposed is a tire abnormality detection device and a detection method thereof, and more particularly, is a tire abnormality detection device and a detection method thereof capable of lowering a possibility of accident by determining an abnormal state of a tire. The device includes an MCU module that is located at a center of a surface of a tire inner liner, a first sensor module that is formed on one side of the MCU module in a width direction of the inner liner, and a second sensor module that is formed on the other side of the MCU module in the width direction of the inner liner, in which the first sensor module and the second sensor module are symmetrically located with respect to the MCU module.

10 Claims, 5 Drawing Sheets

(58) Field of Classification Search
CPC ... B60C 23/001; B60C 23/003; B60C 23/007;
B60C 23/008; B60C 23/009; B60C 23/02;
B60C 23/041; B60C 23/0413; B60C
23/0423; B60C 23/0461; B60C 23/0496;
B60C 23/0498; B60C 23/061; B60G
2800/984; B60T 2240/06; B60T 2240/07;
B60T 2240/08; E01F 9/696; F16D
2066/001; G01L 17/00; G01L 17/005;
G01L 19/0092; G01L 19/08; G01L
19/083; G01L 19/086; G01L 5/28; G01L
7/166; G01B 11/22; G01B 2210/50;
G01B 5/18; G01M 17/02; G01M 17/027;
G01M 17/013; G02F 1/31; G02F
2203/12; H02S 10/12; H02S 20/21; H02S
20/22
See application file for complete search history.

(56) References Cited

U.S. PATENT DOCUMENTS

| | | | | |
|---|---|---|---|---|
| 2004/0026947 A1* | 2/2004 | Kitano | ............... | B60R 11/0235 296/24.34 |
| 2005/0234613 A1* | 10/2005 | Brusarosco | ........... | B60T 8/1725 701/33.7 |
| 2007/0132570 A1* | 6/2007 | Oshiro | .................. | B60C 23/061 340/444 |
| 2007/0171034 A1* | 7/2007 | Mancosu | ............ | B60C 23/0408 703/8 |
| 2007/0213953 A1* | 9/2007 | Kitazaki | ................ | G01B 21/32 73/146 |
| 2007/0240502 A1* | 10/2007 | Morinaga | ........... | B60C 23/0411 73/146 |
| 2008/0103659 A1* | 5/2008 | Mancosu | ................ | B60C 19/00 701/41 |
| 2009/0114005 A1* | 5/2009 | Blixhavn | .............. | B60C 11/243 73/146.5 |
| 2020/0031183 A1* | 1/2020 | Kim | ..................... | H01Q 1/2241 |

FOREIGN PATENT DOCUMENTS

| | | |
|---|---|---|
| KR | 1999-0020867 A | 3/1999 |
| KR | 2004-0026947 A | 4/2004 |
| KR | 2005-0013762 A | 2/2005 |
| KR | 2014-0067431 A | 6/2014 |
| KR | 10-1843256 B1 | 3/2018 |
| KR | 2019-0043689 A | 4/2019 |

* cited by examiner

TIRE ABNORMALITY DETECTION DEVICE AND ITS DETECTION METHOD

BACKGROUND OF THE INVENTION

Field of the Invention

The present disclosure relates to a tire abnormality detection device and a detection method thereof, and more particularly, to a tire abnormality detection device and a detection method thereof capable of lowering a possibility of accident by determining an abnormal state of a tire.

Description of the Related Art

In recent years, in order to measure pressure and temperature inside a tire, a technology of mounting a TPMS on a wheel valve side, measuring data using the TPMS, and wirelessly transmitting and receiving data using RF and the like and transmitting the data to a vehicle has been used.

In order to measure acceleration inside a tire, a method of measuring data by attaching or embedding a sensor inside the tire rather than a valve has also been proposed, and a technology of wirelessly transmitting and receiving data and linking to a smartphone has also been proposed.

As such, in recent years, a wireless system is used to measure internal information of a tire.

Korean Patent Laid-Open Publication No. 2014-0067431 proposes a technology of embedding a piezoelectric sensor in a tire and determining a position of the piezoelectric sensor according to a deformation thereof. More specifically, an algorithm for generating a signal through a change in tensile force and determining a condition of a tire through a comparison table pre-stored in a memory in a circuit has been proposed. However, a method of comparing real-time measured data with a table and a method of using a peak value but correcting data with an average value and comparing the corrected data with a table have a time delay, and therefore are difficult to apply to an algorithm for determining an accident in real time.

In addition, the method of using an average value may have reliability for one or two incorrect data, but has a disadvantage of causing a system error or an error that is recognized as an intermediate value when abnormal data repeatedly appears as the highest or lowest.

In addition, there may be a lot of data entanglement in the process of checking data for each tire part from a plurality of piezoelectric sensors and the cost of upgrading the system's specifications to handle a lot of data.

Korean Patent Laid-Open Publication No. 2004-0026947 discloses a time delay algorithm that detects a vehicle height, performs monitoring for a certain period of time, and generates an error signal when exceeding a set value. The method may secure the reliability of the algorithm through the time delay, but has a disadvantage in that an alarm may be delayed due to the time delay in case of the unexpected accident and thus the determination on the accident may be delayed.

In addition, the time delay algorithm is an algorithm for determining abnormality immediately after a stopped vehicle starts. In this case, the time delay may be applied, but there is a difference from an algorithm for determining an accident by comparing real-time data while actual running.

Korean Patent Laid-Open Publication No. 2005-0013762 discloses a method of measuring air pressure using TPMS, storing the measured air pressure in data, comparing the data with previous data, and then comparing driving stages of a tire.

Such method is not a method of storing real-time data, and is a method of storing the existing value and then not storing currently measured data if there is no difference from current data, and storing the currently measured data if there is a difference from the current data. The currently measured and the previous data are not stored because there is no significant difference over time, but a difference between initial data and data after several hours or tens of minutes may occur outside a critical range. In addition, the system may not be able to confirm that the air pressure of the tire is lowered by comparing the current data with the previous data.

Korean Patent No. 10-1843256 proposed a method of determining an abnormal state of a tire, and proposed an algorithm for determining an abnormal state of a tire and checking the abnormal state of the tire again at regular intervals to determine whether it is a continuous accident or a temporary abnormality. Such a system can determine the abnormal state of the tire when there is an abnormality in all tires, but is difficult to determine a small abnormal state starting from some of the tires.

CITATION LIST

Patent Literature

Patent Literature 1: Korean Patent No. 10-1843256

SUMMARY OF THE INVENTION

An object of the present disclosure is to provide a tire abnormality detection device and a detection method thereof capable of reducing a possibility of accident by determining an abnormal state of a tire.

The technical problems to be achieved by the present disclosure are not limited to the technical problems mentioned above, and other technical problems that are not mentioned may be clearly understood by those with ordinary knowledge in the technical field to which the present disclosure belongs from the following description.

There is provided a tire abnormality detection device, including: an MCU module that is located at a center of a surface of a tire inner liner; a first sensor module that is formed on one side of the MCU module in a width direction of the inner liner; and a second sensor module that is formed on the other side of the MCU module in the width direction of the inner liner, in which the first sensor module and the second sensor module are symmetrically located with respect to the MCU module.

The first sensor module and the second sensor module may be provided to measure at least any one of internal air pressure, internal temperature, acceleration, vibration, and noise of the tire.

The first sensor module may include: a first belt sensor that is attached to an end of a belt of the tire; a first filler sensor that is attached to an end of a bead filler of the tire; and a first bead sensor that is attached to an end portion of a bead wire of the tire.

The second sensor module may include: a second belt sensor that is attached to an end of a belt of the tire; a second filler sensor that is attached to an end of a bead filler of the tire; and a second bead sensor that is attached to an end portion of a bead wire of the tire.

The MCU module may compare a first data value measured by the first sensor module and a second data value measured by the second sensor module provided at a location symmetrical to the first sensor module to determine whether the tire is abnormal.

The MCU module may be provided to determine that the abnormality occurred when a difference between the first data value and the second data value for vibration and noise at the end of the belt is 20% to 30% or more.

The first sensor modules and second sensor modules may be provided in plurality to be spaced apart from each other along a running direction of the tire.

The plurality of first sensor modules and second sensor modules may be provided to be spaced apart from each other by an interval of 10° to 120° along the running direction of the tire. There is provided an abnormality detection method of the tire abnormality detection device, including: a) obtaining a first data value and a second data value by measuring condition information of the tire using the first sensor module and the second sensor module; b) determining whether the tire is abnormal by comparing the obtained first data value and second data value; and c) taking a safety measure according to the difference between the first data value and the second data value when it is determined that the tire is abnormal, in which the first data value and the second data value are values measured by the sensor modules provided at locations symmetrical to each other.

In the step a), the condition information of the tire may include internal air pressure, internal temperature, acceleration, vibration, and noise of the tire.

In the step b), when a difference between a first data value measured by the first sensor module and a second data value measured by the second sensor module provided at a location symmetrical to the first sensor module exceeds a threshold value, it may be determined that the tire is abnormal.

The threshold value may be a preset value from 20% to 30%.

In the step c), when a difference between a first data value and a second data value for vibration and noise at an end of a belt exceeds a threshold value, an alarm may be provided to a driver, when the difference between the first data value and the second data value for the vibration and noise at the end of the belt exceeds 50%, a risk of damage to the tire may be notified through a vehicle alarm, and when the difference between the first data value and the second data value for the vibration and noise at the end of the belt exceeds 65%, a vehicle operation may decelerate and stop.

There is provided a tire equipped with the tire abnormality detection device.

DETAILED DESCRIPTION OF THE PREFERRED EMBODIMENTS

Hereinafter, the present disclosure will be described with reference to the accompanying drawings. However, the present disclosure may be implemented in various different forms, and is not limited to exemplary embodiments described herein. In addition, in the drawings, portions unrelated to the description will be omitted to obviously describe the present disclosure, and similar reference numerals are attached to similar parts throughout the specification.

Throughout the present specification, when any one part is referred to as being "connected (joined, contacted, and coupled) to" another part, it means that any one part and another part are "directly connected to" each other or are "indirectly connected to" each other with another part interposed therebetween. In addition, unless explicitly described to the contrary, "including" any component will be understood to imply the inclusion of other components rather than the exclusion of other components.

The terms used in the present specification are only used to describe specific embodiments, and are not intended to limit the present disclosure. Singular forms are intended to include plural forms unless the context clearly indicates otherwise. It should be further understood that terms "include" or "have" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

Hereinafter, embodiments of the present disclosure will be described in detail with reference to the accompanying drawings.

Figure 1:
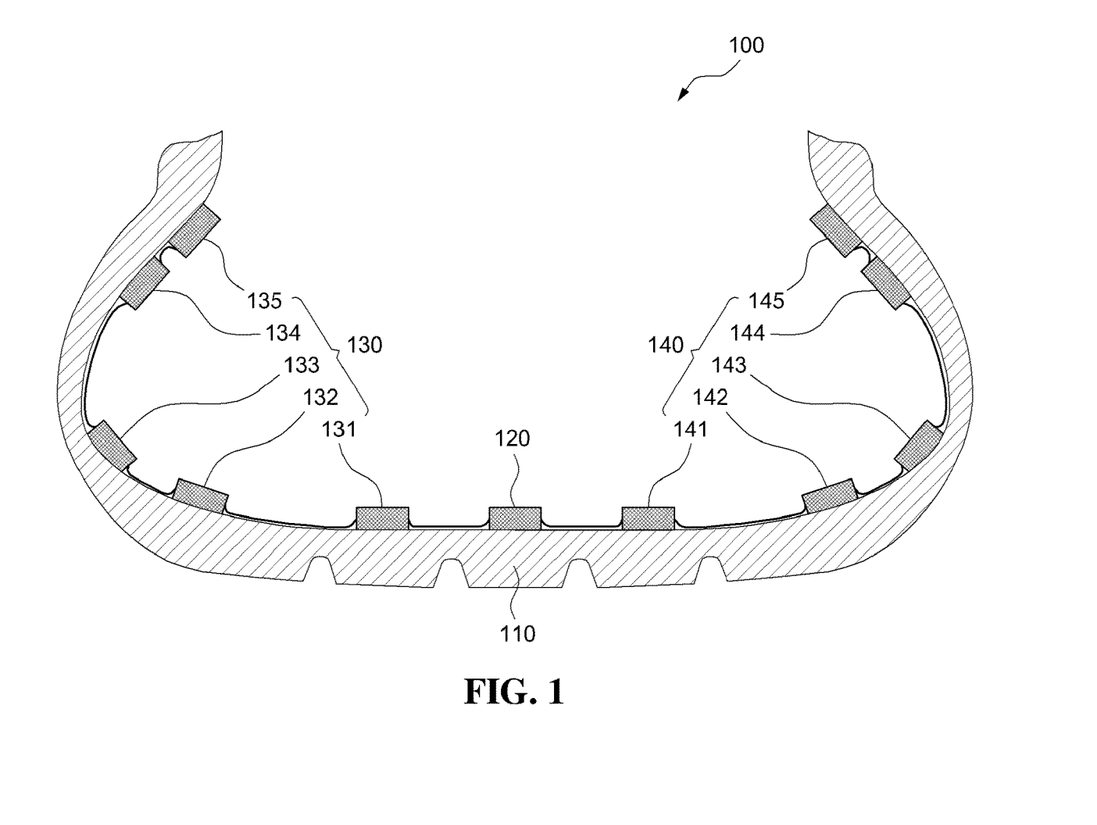
FIG. 1 is an exemplary diagram of a tire abnormality detection device according to an embodiment of the present disclosure.
Figure 2:
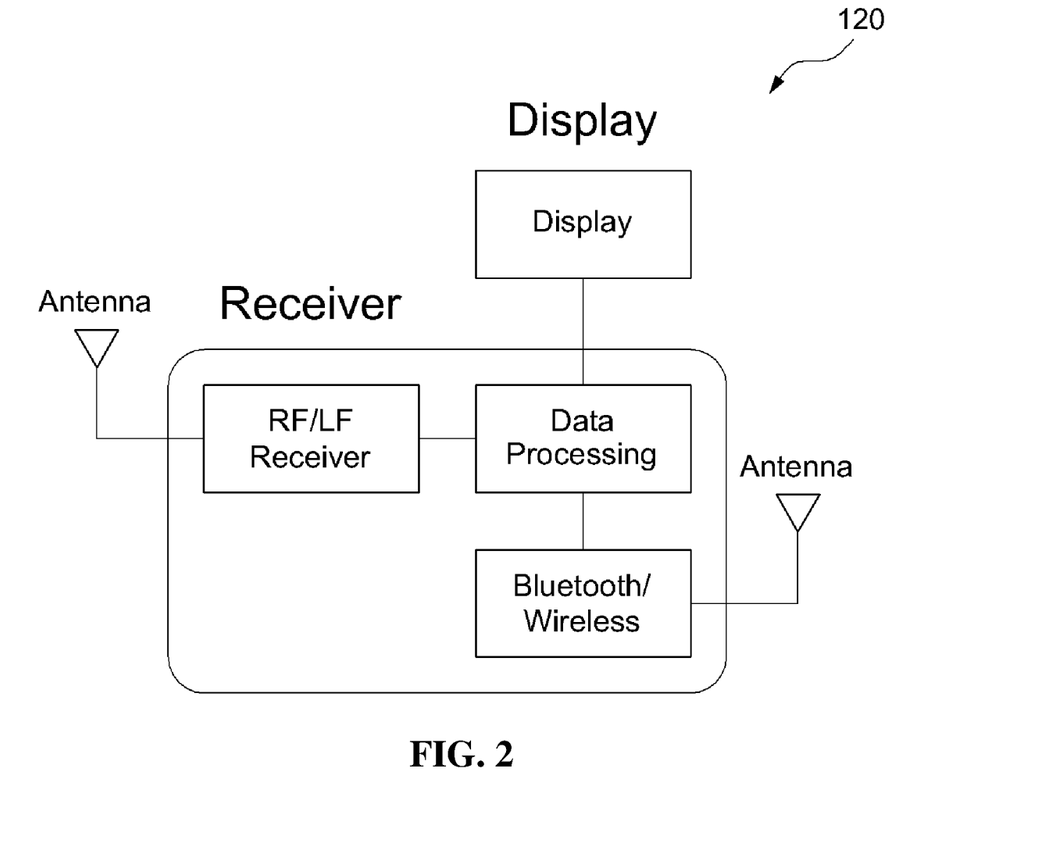
FIG. 2 is an exemplary diagram illustrating a configuration of an MCU module according to an embodiment of the present disclosure.
Figure 3:
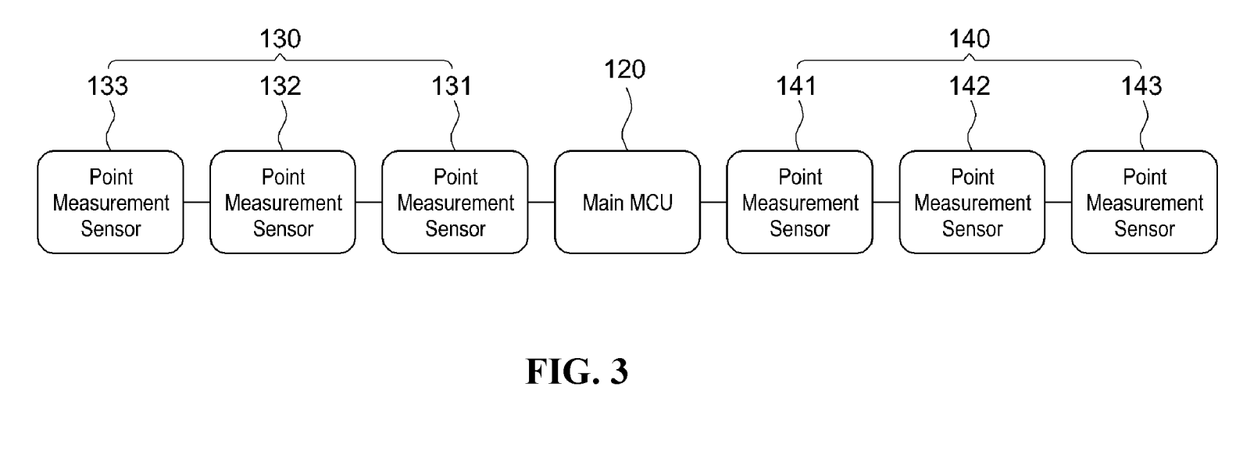
FIG. 3 is an exemplary view in which a first sensor module and a second sensor module are formed in one row according to an embodiment of the present disclosure.

FIG. 1 is an exemplary diagram of a tire abnormality detection device according to an embodiment of the present disclosure, FIG. 2 is an exemplary diagram illustrating a configuration of an MCU module according to an embodiment of the present disclosure, and FIG. 3 is an exemplary view in which a first sensor module and a second sensor module are formed in one row according to an embodiment of the present disclosure.

As illustrated in FIGS. 1 to 3, a tire abnormality detection device 100 includes an inner liner 110, an MCU module 120, a first sensor module 130, and a second sensor module 140, in which the first sensor module 130 and the second sensor module 140 may be provided at locations symmetrical to each other with respect to the MCU module 120.

The MCU module 120, the first sensor module 130, and the second sensor module 140 may be attached to a surface of the inner liner 110, and may be attached using an adhesive or a sticker.

The MCU module 120 may be located at a center of the surface of the tire inner liner 110.

The MCU module 120 may be configured to include a radio frequency and low frequency receiver (RF/LF receiver), a data processing unit, Bluetooth, a power supply, an antenna, and an A/D converter.

The MCU module 120 may receive condition information of a tire measured by the first sensor module 130 and the second sensor module 140, and may be provided to determine an abnormality state according to the received condition information of the tire.

In particular, the MCU module 120 may be provided to compare a first data value measured by the first sensor module 130 and a second data value measured by the second sensor module 140 provided at a location symmetrical to the first sensor module 130 to determine whether the tire is abnormal.

When the abnormality of the tire is detected, the MCU module 120 may be provided to take measures accordingly.

The first sensor module 130 may be formed on one side of the MCU module 120 in a width direction of the inner liner 110.

Specifically, the first sensor module 130 includes a first belt sensor 131, a first filler sensor 132, a first bead sensor 133, a first supplementary sensor 134, and a first additional sensor 135.

The first belt sensor 131 may be attached to an end of a belt of the tire.

The first filler sensor 132 may be attached to an end of a bead filler of the tire.

The first bead sensor 133 may be attached to an end portion of a bead wire of the tire.

The first supplementary sensor 134 and the first additional sensor 135 may be formed on one side of the first bead sensor 133 at intervals.

The sensors of the first sensor module 130 may be provided to measure at least any one of internal air pressure, internal temperature, acceleration, vibration, and noise of a tire.

The second sensor module 140 may be formed on the other side of the MCU module 120 in the width direction of the inner liner 110.

Specifically, the second sensor module 140 includes a second belt sensor 141, a second filler sensor 142, a second bead sensor 143, a second supplementary sensor 144, and a second additional sensor 145.

The second belt sensor 141 may be attached to the end of the belt of the tire.

The second filler sensor 142 may be attached to the end of the bead filler of the tire.

The second bead sensor 143 may be attached to the end portion of the bead wire of the tire.

The second supplementary sensor 144 and the second additional sensor 145 may be formed on the other side of the second bead sensor 143 at intervals.

The sensors of the second sensor module 140 may be provided to measure at least any one of the internal air pressure, internal temperature, acceleration, vibration, and noise of the tire.

As such, the first sensor module 130 and the second sensor module 140 may include the sensors attached to the end of the belt, the end of the bead filler, and the end of the bead wire where the abnormality occurs the most.

When the difference between the first data value measured by the first sensor module 130 and the second data value measured by the second sensor module 140 provided at a location symmetrical to the first sensor module 130 is in the range of 20% to 30%, the MCU module 120 may be provided to determine that there is no abnormality.

The difference criterion for determining the abnormality may be set in advance.

In particular, the MCU module is provided to determine that the abnormality occurred when the difference between the first data value and the second data value for vibration and noise at the end of the belt is 20% to 30% or more.

As an example, when the first data value for noise and vibration measured by the first belt sensor 131 of the first sensor module 130 is referred to as a and the second data value for noise and vibration measured by the second belt sensor 141 provided at a location symmetrical to the first belt sensor 131 with respect to the MCU module 120 is referred to as b, if a difference between the values a and b are 35%, the MCU module may determine that the tire is abnormal.

As described above, according to the present disclosure, sensors may be provided at locations symmetrical to each other with respect to the MCU module 120, and the sensors provided at the locations symmetrical to each other compare the measured data values to determine whether the tire is abnormal.

The MCU module 120 may be provided to take safety measures accordingly when it is determined that the tire is abnormal.

Specifically, the MCU module 120 may be provided to provide an alarm to a driver when the difference between the first data value and the second data value for vibration and noise at the end of the belt exceeds a threshold value, notify damage to the tire through the vehicle alarm when the difference between the first data value and the second data value for vibration and noise at the end of the belt exceeds 50%, and decelerate and stop the vehicle operation when the difference between the first data value and the second data value for vibration and noise of the end of the belt exceeds 65%.

Figure 4:
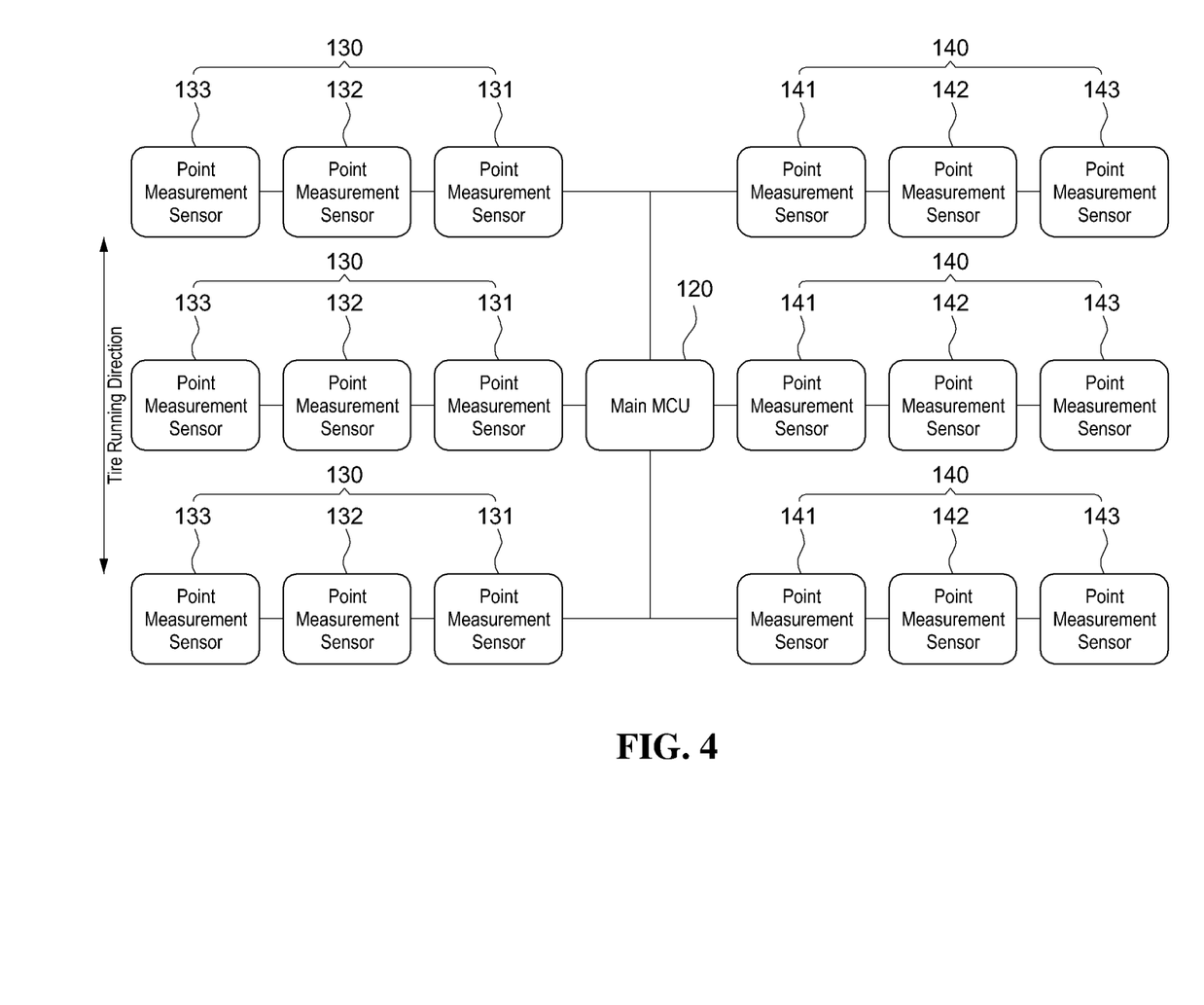
FIG. 4 is an exemplary view in which the first sensor module and the second sensor module are formed in a plurality of rows according to an embodiment of the present disclosure.

FIG. 4 is an exemplary view in which the first sensor module and the second sensor module are formed in a plurality of rows according to an embodiment of the present disclosure. The plurality of first sensor modules 120 and second sensor modules 130 provided as illustrated in FIG. 4 may be provided to be spaced apart from each other along the running direction of the tire.

More specifically, the plurality of first sensor modules 120 and second sensor modules 130 may be provided to be spaced apart from each other by an interval of 10° to 120° along the running direction of the tire.

As such, the first sensor modules 120 and second sensor modules 130 provided in plurality to be spaced apart from each other along the running direction of the tire may be more accurately detect the abnormality of the tire.

Figure 5:
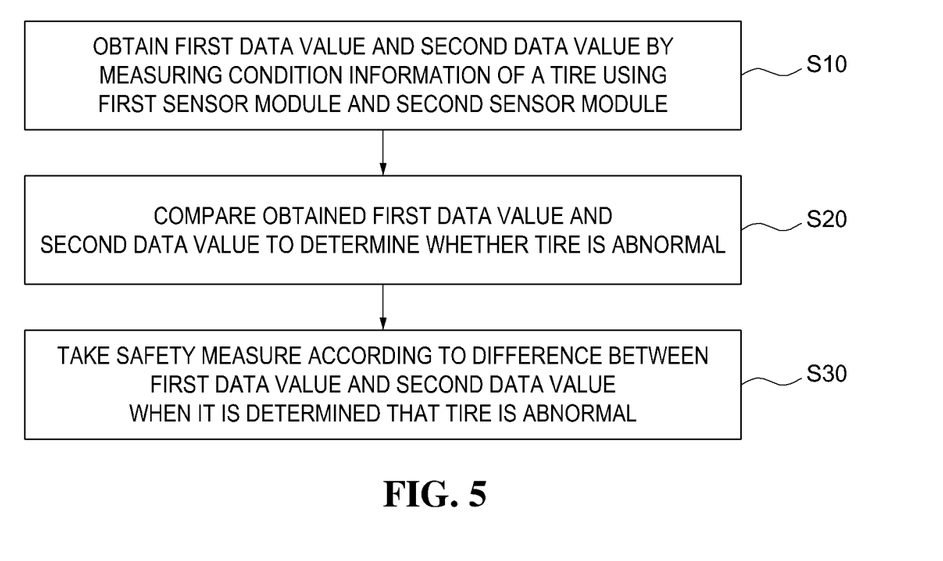
FIG. 5 is a flowchart of a detection method of a tire abnormality detection device according to an embodiment of the present disclosure.

FIG. 5 is a flowchart of a detection method of a tire abnormality detection device according to an embodiment of the present disclosure.

As illustrated in FIG. 5, the abnormality detection method of the tire abnormality detection device includes, first, step S10 of obtaining the first data value and the second data value by measuring the condition information of the tire using the first sensor module and the second sensor module.

In the step S10 of obtaining the first data value and the second data value by measuring the condition information of the tire using the first sensor module and the second sensor module, the first sensor module 130 and the second sensor module 140 may be provided to measure the condition information of the tire at locations symmetrical to each other with respect to the MCU module 120.

Here, the condition information of the tire may include the internal air pressure, internal temperature, acceleration, vibration, and noise of the tire.

After the step S10 of obtaining the first data value and the second data value by measuring the condition information of the tire using the first sensor module and the second sensor module, the step S20 of determining whether the tire is abnormal by comparing the obtained first data value and second data value may be performed.

In the step S20 of determining whether the tire is abnormal by comparing the obtained first data value and second data value, when the difference between the first data value measured by the first sensor module 130 and the second data value measured by the second sensor module 130 provided at the location symmetrical to the first sensor module exceeds the threshold value, it may be determined that there is an abnormality.

Here, the first data value and the second data value may be values measured by the sensor modules provided at locations symmetrical to each other.

In addition, the threshold value may be a preset value from 20% to 30%.

That is, the more sensitively you want to determine whether the abnormality occurs, the smaller the threshold value may be set in advance.

After the step S20 of comparing the obtained first data value and second data value to determine whether the tire is abnormal, when it is determined that the tire is abnormal, the step S30 of taking the safety measures may be performed according to the difference between the first data value and the second data value.

Specifically, in the step S30 of taking the safety measures according to the difference between the first data value and the second data value when it is determined that the tire is abnormal, when the difference between the first data value and the second data value for vibration and noise at the end of the belt exceeds the threshold value, it may be determined that separation has started at the end of the belt, and an alarm may be provided to the driver.

Specifically, in the step S30 of taking the safety measures according to the difference between the first data value and the second data value when it is determined that the tire is abnormal, when the difference between the first data value and the second data value for vibration and noise at the end of the belt exceeds 50%, the risk of damage to the tire may be notified through the vehicle alarm.

In addition, in the step S30 of taking the safety measures according to the difference between the first data value and the second data value when it is determined that the tire is abnormal, when the difference between the first data value and the second data value for vibration and noise at the end of the belt exceeds 65%, the vehicle operation may decelerate and stop.

The present disclosure prepared in this way can not only detect the abnormal state of the tire, but also discern the risk and take safety measures accordingly.

The effect of the present disclosure according to the above configuration can determine the abnormal state of the tire to give an alarm to the driver so as to stop the operation, thereby preventing the accidents.

The effect of the present disclosure is not limited to the above effects, and should be understood to include all effects that can be inferred from the detailed description of the present disclosure or the composition of the invention described in the claims.

It can be understood that the above description of the disclosure is for illustrative purposes only, and those skilled in the art to which the disclosure belongs can easily convert the disclosure into another specific form without changing the technical ideas or essential features of the disclosure. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present disclosure will be defined by the claims rather than the above-mentioned description and all modifications and alternations derived from the claims and their equivalents are included in the scope of the present disclosure.

What is claimed is:

1. A tire abnormality detection device for a tire of a vehicle, comprising:
    a microcontroller unit (MCU) located at a center of a surface of an inner liner of the tire;
    a first sensor assembly disposed on the inner liner at one side of the MCU in a width direction of the inner liner; and
    a second sensor assembly disposed on the inner liner at another side of the MCU in the width direction of the inner liner,
    wherein the first sensor assembly and the second sensor assembly are symmetrically located with respect to the MCU,
    wherein the MCU is configured to compare a first data value measured by the first sensor assembly and a second data value measured by the second sensor assembly disposed at a location symmetrical to the first sensor assembly to determine whether the tire is abnormal, and
    wherein the MCU is configured to determine that the abnormality occurred when a difference between the first data value and the second data value for vibration and noise at an end of the belt is 20% or more.

2. The tire abnormality detection device of claim 1, wherein the first sensor assembly and the second sensor assembly are configured to measure at least one of internal air pressure, internal temperature, acceleration, the vibration, and the noise of the tire.

3. The tire abnormality detection device of claim 1, wherein the first sensor assembly includes:
    a first belt sensor attached to a first end of the belt of the tire;
    a first filler sensor attached to a first end of a bead filler of the tire; and
    a first bead sensor attached to a first end portion of a bead wire of the tire.

4. The tire abnormality detection device of claim 1, wherein the second sensor assembly includes:
    a second belt sensor attached to a second end of the belt of the tire;
    a second filler sensor attached to a second end of a bead filler of the tire; and
    a second bead sensor attached to a second end portion of a bead wire of the tire.

5. A tire equipped with the tire abnormality detection device of claim 1.

6. The tire abnormality detection device of claim 1, wherein the first sensor assembly and second sensor assembly include a plurality of sensors spaced apart from each other along a running direction of the tire.

7. The tire abnormality detection device of claim 6, wherein the plurality of sensors are spaced apart from each other by an interval of 10° to 120° along the running direction of the tire.

8. An abnormality detection method of a tire abnormality detection device for a tire of a vehicle, the tire abnormality detection device including an MCU located at a center of a surface of an inner liner of the tire, a first sensor assembly disposed on the inner liner at one side of the MCU in a width direction of the inner liner, and a second sensor assembly disposed on the inner liner at another side of the MCU in the width direction of the inner liner, the abnormality detection method comprising:

a) obtaining a first data value and a second data value for vibration and noise at an end of a belt of the tire by measuring condition information of the tire using the first sensor assembly and the second sensor assembly;
b) determining whether the tire is abnormal by comparing the first data value obtained by the first sensor assembly and the second data value obtained by the second sensor assembly; and
c) taking a safety measure according to the difference between the first data value and the second data value when it is determined that the tire is abnormal,
wherein the first sensor assembly and the second sensor assembly are symmetrically located with respect to the MCU,
wherein in the step c),
when the difference between the first data value and the second data value for the vibration and noise at the end of the belt exceeds a first threshold value, an alarm is provided to a driver,
when the difference between the first data value and the second data value for the vibration and noise at the end of the belt exceeds a second threshold value greater than the first threshold value, a risk of damage of the tire is notified through a vehicle alarm, and
when the difference between the first data value and the second data value for the vibration and noise at the end of the belt exceeds a third threshold value greater than the second threshold value, an operation of the vehicle decelerates or stops.

9. The abnormality detection method of claim 8, wherein in the step a), the condition information of the tire includes at least one of internal air pressure, internal temperature, acceleration, the vibration, and the noise of the tire.

10. The abnormality detection method of claim 8, wherein in the step b), when the difference between the first data value measured by the first sensor assembly and the second data value measured by the second sensor assembly exceeds 20%, it is determined that the tire is abnormal.

* * * * *